United States Patent [19]

Binder et al.

[11] Patent Number: 5,281,012
[45] Date of Patent: Jan. 25, 1994

[54] APPARATUS FOR DISTRIBUTION OF BRAKE FORCE BETWEEN FRONT AND REAR AXLES

[75] Inventors: Juergen Binder, Schwieberdingen; Werner Urban, Ditzingen; Karl-Heinz Willmann, Freiberg, all of Fed. Rep. of Germany

[73] Assignee: Robert Bosch GmbH, Stuttgart, Fed. Rep. of Germany

[21] Appl. No.: 870,047

[22] Filed: Apr. 16, 1992

[30] Foreign Application Priority Data

Apr. 16, 1991 [DE] Fed. Rep. of Germany ....... 4112388

[51] Int. Cl.$^5$ ................................................ B60T 8/26
[52] U.S. Cl. .................................. 303/113.5; 303/111
[58] Field of Search ....................... 303/113.5, 96, 111, 303/100, 103, 113.1, 116.1, 116.2; 364/426.01-426.03

[56] References Cited

U.S. PATENT DOCUMENTS

| | | | |
|---|---|---|---|
| 3,574,415 | 4/1971 | Stamm | 303/96 |
| 3,608,978 | 9/1971 | Neisch | 303/96 |
| 3,888,549 | 6/1975 | Grosseau | 303/96 |
| 3,980,344 | 9/1976 | Burckhardt | 303/6 |
| 4,626,042 | 12/1986 | Burckhardt | 303/106 |
| 4,699,436 | 10/1987 | Klein | 303/114 |
| 4,809,181 | 2/1989 | Ito et al. | 303/100 X |
| 4,824,186 | 4/1989 | Leiber et al. | 303/100 X |
| 4,850,650 | 7/1989 | Eckert et al. | 303/100 X |
| 4,852,009 | 7/1989 | Jonner et al. | 364/426.02 |
| 4,861,116 | 8/1989 | Bernhardt et al. | 303/100 |
| 4,950,038 | 8/1990 | Ocvirk et al. | 303/113.2 |

FOREIGN PATENT DOCUMENTS

| | | | |
|---|---|---|---|
| 370756 | 5/1990 | European Pat. Off. | 303/103 |
| 2056967 | 5/1971 | Fed. Rep. of Germany . | |
| 3240275 | 5/1984 | Fed. Rep. of Germany . | |
| 3700742 | 6/1988 | Fed. Rep. of Germany . | |
| 3721210 | 1/1989 | Fed. Rep. of Germany . | |
| 3292246 | 12/1991 | Japan | 303/103 |
| 1465613 | 2/1977 | United Kingdom . | |
| 2135413 | 8/1984 | United Kingdom | 303/103 |
| 2136519 | 9/1984 | United Kingdom . | |
| 2214254 | 8/1989 | United Kingdom | 303/113.2 |
| 2235506 | 6/1991 | United Kingdom . | |
| 2242489 | 10/1991 | United Kingdom | 303/113.2 |
| 2244772 | 12/1991 | United Kingdom | 303/113.2 |

*Primary Examiner*—Robert J. Oberleitner
*Assistant Examiner*—Alfred Muratori
*Attorney, Agent, or Firm*—Felfe & Lynch

[57] ABSTRACT

When braking occurs but the ABS is not in operation, the brakes at the rear wheels are isolated from the master cylinder by a solenoid valve. Brake pressure at the rear wheels is then provided by a pump and regulated so that the slower rear wheel runs slower than the faster front wheel by a given small speed difference.

7 Claims, 8 Drawing Sheets

APPARATUS FOR DISTRIBUTION OF BRAKE FORCE BETWEEN FRONT AND REAR AXLES

BACKGROUND OF THE INVENTION

The distribution of braking force in a conventional vehicle relates to the ratio between the front and rear axle braking force.

This ratio cannot be affected by the driver, since he brakes both axles with a single brake pedal, so that, in the design of vehicle brakes, the braking force distribution has to be very deliberately established.

The purpose of an ideal braking force distribution consists on the one hand in braking the front and rear axles with equal force (with respect to the dynamic axle loads), and on the other hand in selecting the distribution when braking on curves such that a neutral performance is achieved. In this case the aim of a neutral performance is secondary to the equal braking force.

The equal braking force (with respect to the dynamic axle loading) front and rear can be achieved in straight-line driving. On curves (particularly at the edge of the curve), the braking of the rear axle must be made lower than at the front axle, to provide good handling.

The reason is that, in spite of the axle load shift, the centrifugal force acts at the center of gravity of the vehicle, so that the rear axle has to transfer a higher lateral guidance force with respect to the dynamic axle load than the front axle. This higher lateral guidance force is achieved by reduced braking force.

The ideal braking force division between front and rear depends on the following factors:
(1) static weight distribution and location of center of gravity (at the current load);
(2) longitudinal slowing of the vehicle;
(3) transverse acceleration of the vehicle;
(4) engine reverse torque;
(5) upgrade/downgrade.

In conventional brakes the braking force distribution is tuned independently of these factors; it consists of a fixed ratio between front and rear and is brought about by the fact that the same hydraulic pressure acts both front and rear on different size brakes.

The braking force distribution is selected in accordance with the principle that the rear axle must not lock before the front axle. The reason for this requirement is that, if the rear axle of the vehicle is too heavily braked the vehicle can become unstable in braking on turns, i.e., it can lead to lateral skidding.

Disadvantages of the conventional braking force distributions are:
(1) poor braking distance, as long as the front wheels do not lock up, or in the case of ABS control (especially with the vehicle loaded);
(2) heavy stress on the front wheel brakes (lining wear), large brakes need more space;
(3) limited steerability due to heavy braking of front wheels;
(4) unstable braking on turns is possible if the following factors are involved:
 (a) reverse engine torque;
 (b) downhill driving;
 (c) great deceleration (above the intersection of the ideal distribution with the conventional);
 (d) brake force distribution designed for high rear axle braking (the distribution required by the regulator for straight travel can nevertheless be satisfied);
 (e) variations in the brake pad friction on the brake disk;
 (f) variations in the brake system (hot front wheel brake, fading).

If in a vehicle the ideal braking force distribution depends greatly on the longitudinal deceleration of the vehicle, a rear axle pressure limiter or reducer is normally used.

If in a vehicle the ideal braking force distribution depends also to a great extent on the loading, a load-related rear axle pressure reducer or limiter is commonly used.

These limiters or reducers are certainly necessary for many vehicles, but they basically impair stability when braking on curves (in comparison to conventional fixed tuning, i.e., to unbroken straight lines).

Another problem is that the pressure reducers and limiters can lose their function due to a defect, without the defect being noticed by the driver (their operation isn't even tested in routine servicing).

SUMMARY OF THE INVENTION

In the invention, the rear axle pressure is controlled such that the slowest rear wheel runs slightly slower than the fastest front wheel when the ABS is not operating. In the straightaway, therefore, a high rear axle braking is assured. On curves, due to the circular kinematics and the shifting of the wheel load (left-right), the rear axle with this control is braked less than the front axle.

The invention describes a concrete solution of an electronic braking force distribution control, wherein only wheel speed sensors and pressure sensors for the rear axle and front axle are needed.

BRIEF DESCRIPTION OF THE DRAWINGS

FIGS. 6a, 6b to 10 are explanatory diagrams.

DETAILED DESCRIPTION OF THE PREFERRED EMBODIMENTS

Figure 1:
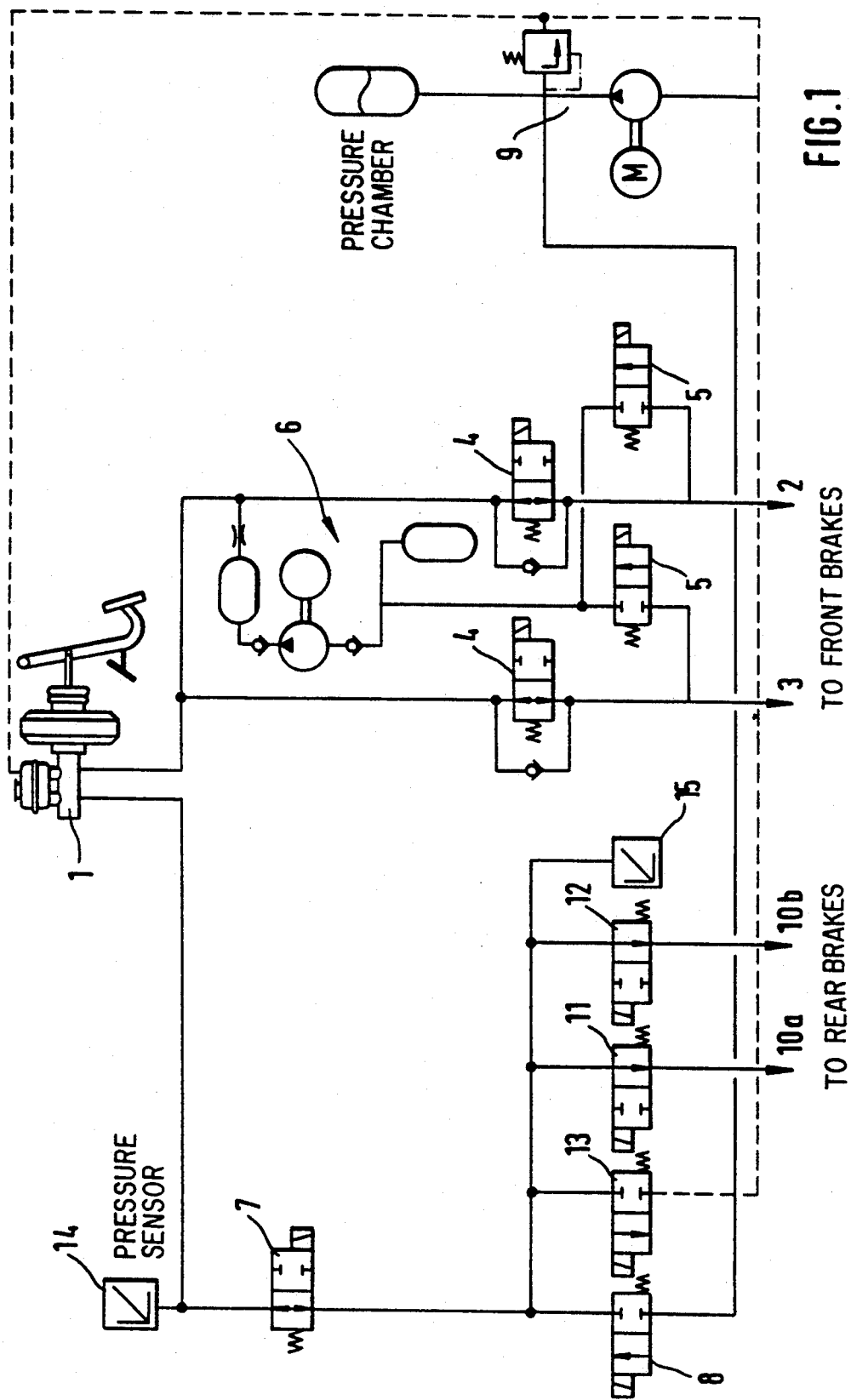
FIG. 1 is a hydraulic block circuit diagram for a first embodiment of the invention.

The hydraulic block circuit diagram represented in FIG. 1 shows a master brake cylinder 1 by which the front wheel brakes connected to lines 2 and 3 are directly operated. Valves 4 are the inlet valves and valves 5 the outlet valves of an ABS and a pump 6 serves as the return pump.

When the brakes are applied a solenoid valve 7 (isolating valve) shuts off the rear axle brake circuit from the master brake cylinder, while another solenoid valve 8 opens and turns on a pressure generator 9 (pump with motor, pressure chamber and relief valve) to build up pressure on the rear wheel brakes connected at 10a and 10b. Inlet valves 11 and 12 and an outlet valve 13 (regulating valve) are used for the antilock brake control and for ASR. The outlet valve 13 is also used for the pressure control according to the invention. The different pressures (PVA, PHA) are measured by pressure sensors 14 and 15.

Figure 2:
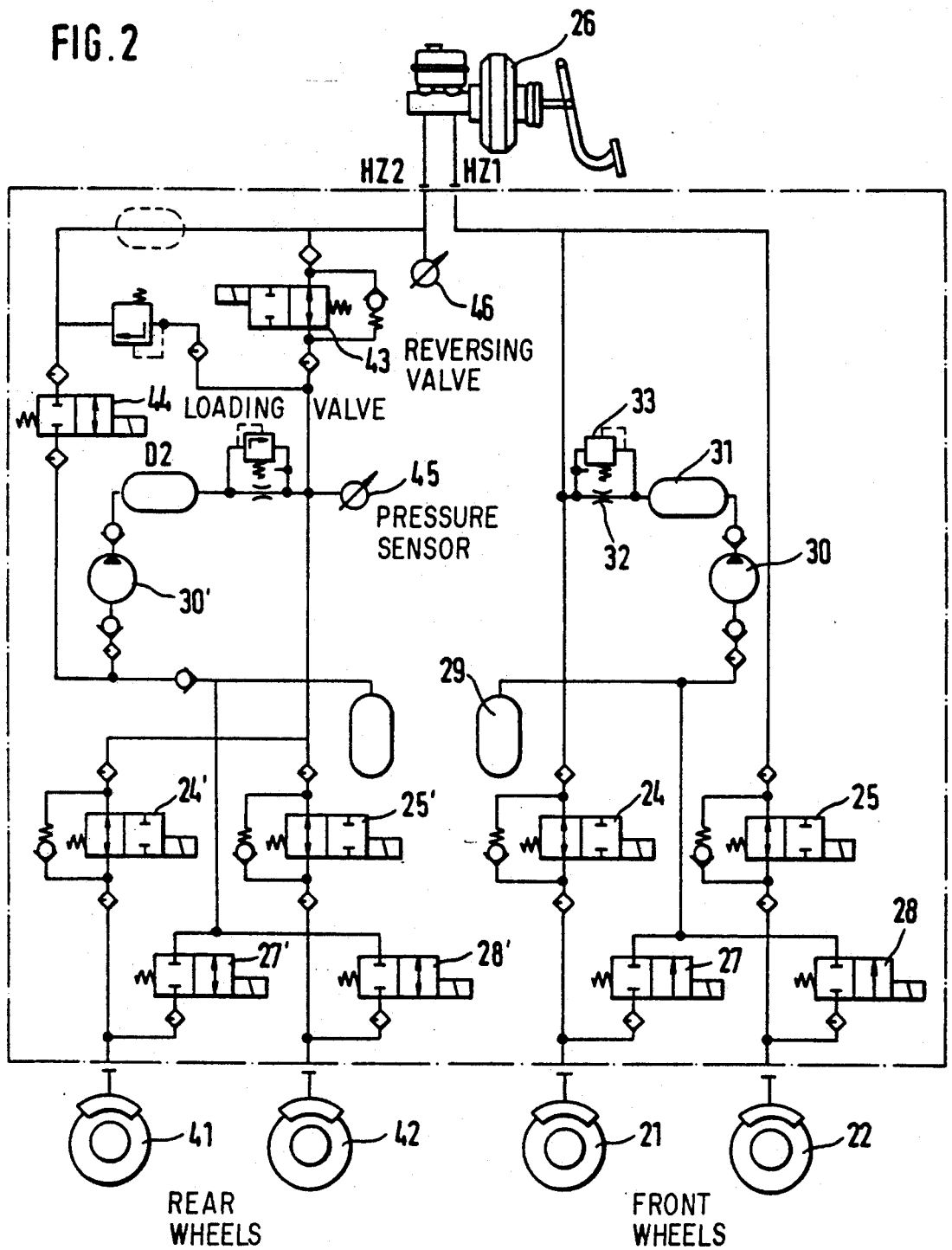
FIG. 2 is a hydraulic block circuit diagram for a second embodiment of the invention.

In FIG. 2 the brakes of the front wheels 21 and 22 are connected by ABS inlet valves 24 and 25 to the first master brake cylinder of the brake unit 26. With the two inlet valves 24 and 25 the outlet valves 27 and 28 are associated, which temporarily release pressure to a reservoir 29 in case of ABS.

A self-priming return pump 30 with check valves ahead of the suction and behind the discharge, which runs in case of ABS, pumps hydraulic fluid through a pressure chamber 31 and a constriction 32 back into the brake circuit. The constriction is connected parallel to a relief valve 33.

The hydraulic circuit associated with the driven rear wheels 41 and 42 is constructed in almost entirely the same manner, and is connected to the second master brake cylinder of the brake unit 26. Here, however, there is also provided a reversing valve (isolating valve) and a loading valve 44 (regulating valve).

In a case of ASR, valves 43 and 44 are reversed, pump 30 starts, and produces brake pressure. The brake pressure at the wheels 41 and 42 is modulated by the valve 24' to 28'. To build up pressure the valves 43 and 44 must not be in the position shown. The return pump 30' and valves 43 and 44 can also be used to vary the pressure in accordance with the invention. Here too, pressure sensors 45 and 46 are provided.

Figure 3:
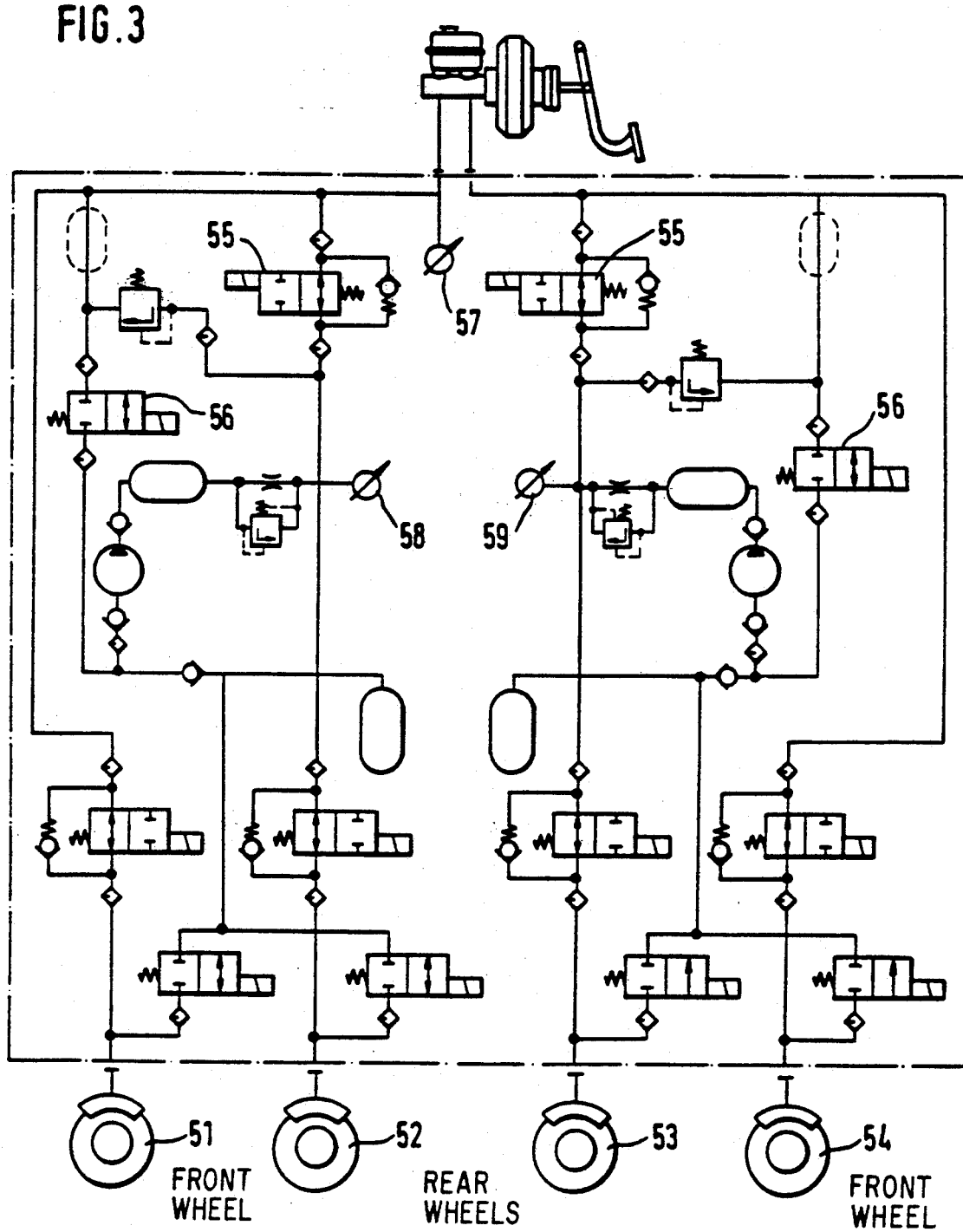
FIG. 3 is a hydraulic block circuit diagram for a third embodiment of the invention.

FIG. 3 differs from FIG. 2 in that the brakes of diagonally situated wheels 51 and 52, and 53 and 54, each belong to one brake circuit. Here too the brake pressure of the first wheel of the driven axle (e.g., the rear axle with wheels 52 and 53) that shows a tendency to slip is modulated, also by using a reversing valve 55 and a loading valve 56.

In the case of the control of the rear wheel pressure in accordance with the invention, the two pumps, both reversing valves 55 and both loading valves 56, must act in synchronism. Here too, as will be shown later, pressure sensors 57 to 59 are needed.

For the system in FIG. 2, the following applies: As braking begins the reversing valve 43 is closed, the pump 30' starts up and the loading valve 44 is opened. As soon as the desired pressure $P_{HA}$ is reached, either the loading valve 44 is closed again or the pump 30' is shut off. If the pressure is reduced again (driver releases the brake) the reversing valve 43 is opened until the desired pressure is regained. If the pressure has to be reduced going around a curve, the rear axle outlet valves 27', 28' are opened and the inlet valves 24', 25' closed.

The volume released is received by a reservoir as long as the pump is not running.

When straight driving is resumed and the volume is again needed to build up pressure the pump is restarted, the loading valve is closed, as long as the volume can be taken from the reservoir. In the circuit of FIG. 3 the process is similar to that of FIG. 2. The systems of FIGS. 2 and 3 have the following advantages:
simple hydraulic unit of the ASR series;
no changes necessary in the vehicle's brake system;
in case of ABS failure the original brake force distribution acts, assuring stability of the vehicle;
damped pedal reaction due to the control philosophy described.

Figure 4:
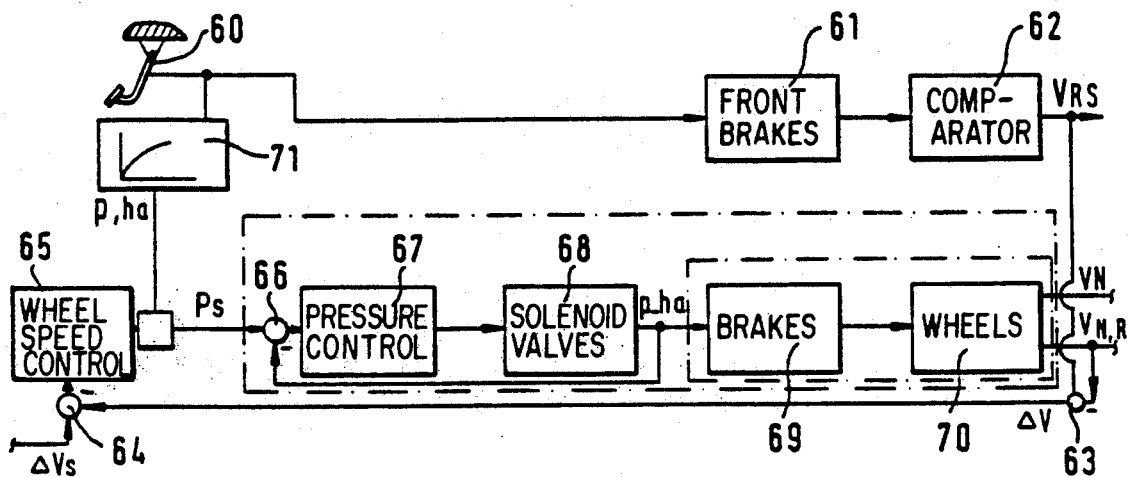
FIG. 4 is a diagram control circuit for the inventive apparatus.

In FIG. 4 is shown the block diagram of a control circuit. In consists essentially of a wheel speed control circuit 65 whose purpose is to set the detected rotatory speed difference between the fastest front wheel and the slowest rear wheel to a predetermined level, and of a subordinated pressure control circuit 67 which sets a computed desired pressure at the rear axle (level of the wheel speed control).

FIG. 4 shows a brake pedal 60 which feeds pressure directly to the brakes 61 of the front axle. The faster wheel of the braked front wheels is selected by comparator 62. The difference between the speed $V_{RS}$ of the faster front wheel and the speed $V_{HR}$ selected slower rear wheel is determined in a subtractor 63; this difference $\Delta v$ is compared with a target value $\Delta v_S$ in a subtractor 64. The deviation from the target value signal is fed to a wheel speed control 65 which uses it to establish the target pressure $P_S$. The difference between the target pressure $P_S$ and the pressure $P_{HA}$ acting on the rear wheels is formed in a subtractor 66, and the result is fed to a pressure control 67 which uses it to determine the actuating signals for the solenoid valve or valves 68 of the rear wheels. The brake pressure thus determined acts through the brakes 69 on the rear wheels 70.

In FIG. 4 it is also indicated that the rear axle target brake pressure $P_{S\text{-}HA}$ is limited by the ideal parabola (block 71) of the braking force distribution for a fully loaded vehicle (rear axle braking pressure must lie below the curve).

Figure 5:
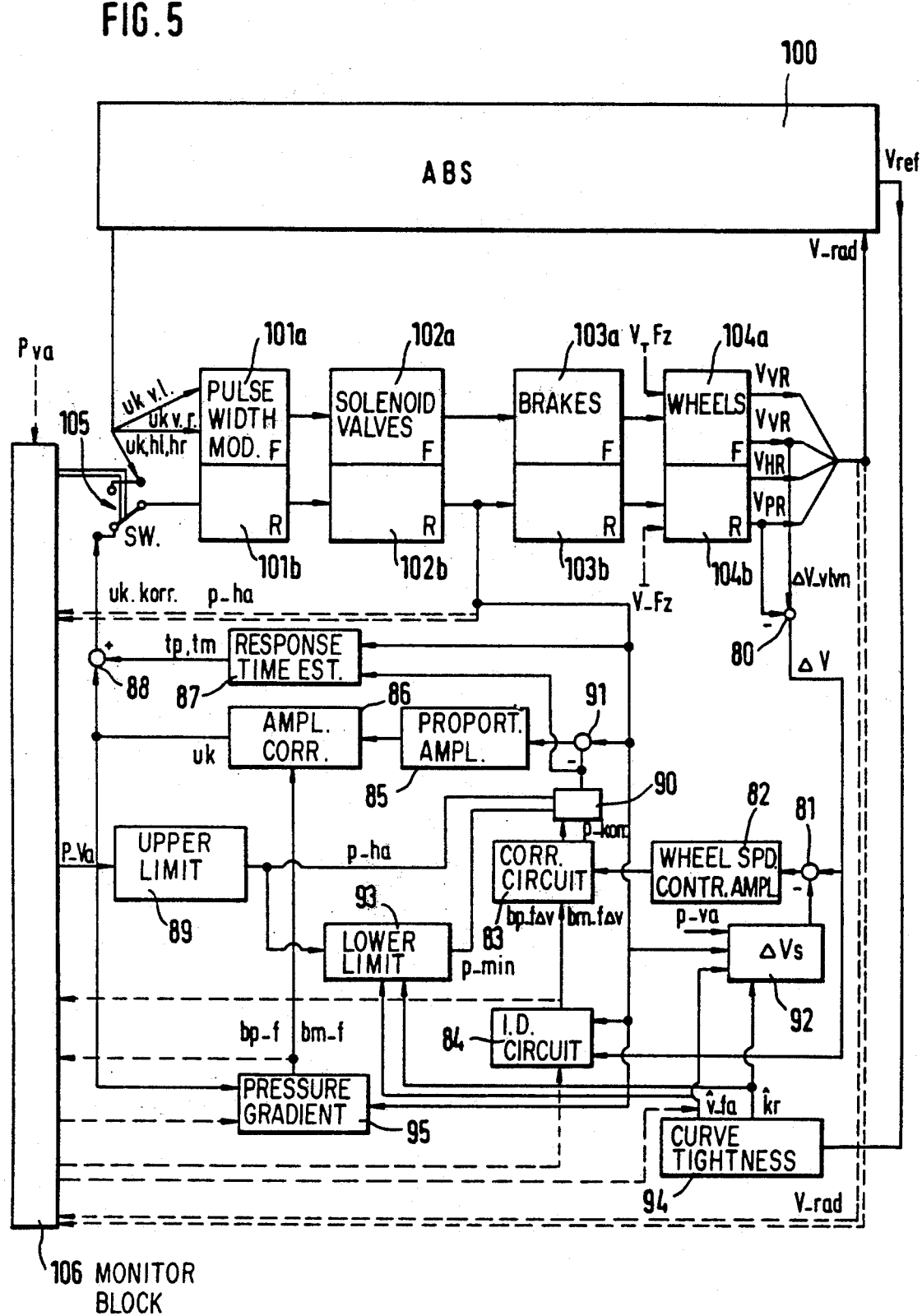
FIG. 5 is a more extensive control circuit diagram for an embodiment of the invention.

FIG. 5 shows an embodiment represented in full. The measured values are indicated by broken lines.

In this figure an ABS is represented as a block 100. Under it are blocks 101a for the pulse width modulation of the solenoid valves 102a, the brakes 103a, and the wheels 104a of the front axle and corresponding blocks 101b, 102b, 103b, 104b for the rear axle. Modulation of pressure is involved on the front axle only during ABS operation. A switch system 105 is controlled by a monitor block 106 which can distinguish the ABS action from normal brake action and then actuates the switch 105.

From the measured wheel speeds, the slowest rear wheel is determined through a $PT_1$ filter (low-pass). The two front wheels are subjected to a stricter filtration, since in the partial-braking range under consideration no pressure modulation takes place at the front axle and thus the front wheel speeds serve as a reference for the rear wheel speeds. The difference between the fastest front wheel and the slowest rear wheel is determined in a subtractor 80.

The magnitude $\Delta v$ thus formed is compared with a set value $\Delta v_S$, which is to be determined according to the driving situation, in another comparator 81 and the difference $\Delta\Delta v$ is fed to a wheel speed control amplifier 82. This amplifier has essentially a proportional-integral transfer characteristic of the following form:

$$P_S(k) = P_{HA}(k) - k_p \Delta\Delta v(k) + K_i \sum_{j=1}^{k} \Delta\Delta v(j)$$

wherein
$p_s(k)$ is the set pressure
$p_{HA}$ is the rear axle braking pressure
$k_p$ and $k_i$ are constants (e.g., $k_p \approx 1 \times 10^2$ to $10^3$ bar/m$^2$
$k_i$ near 0 or 0)

Figure 6A:
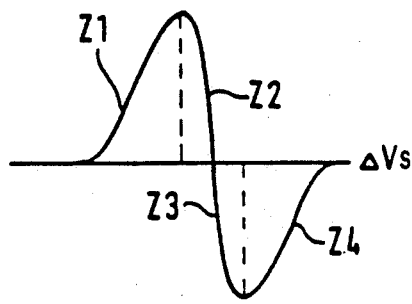
Figure 6B:
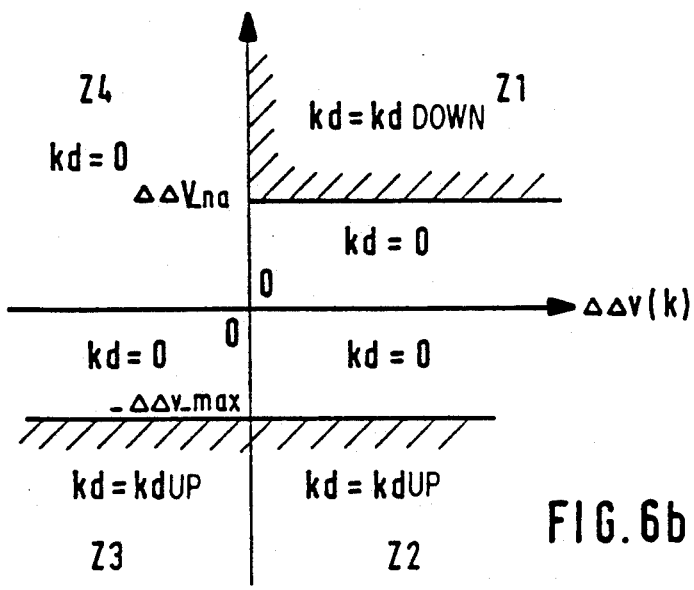

To improve the signal-to-noise ratio, allowance is made for various differential percentages according to the state of the system. Four states are distinguished (see FIGS. 6a and 6b).

1) When the Δv present runs rapidly away from the target value Δv$_S$ (i.e., Δv (k)−Δv (k−1)) exceeds an established threshold ΔΔv$_{-max}$), e.g., on account of a problem (icy pavement), an additional reduction of pressure is performed in proportion to the Δv increase between past and present cycle (Z1).
2) When the Δv present approaches the target value too rapidly (i.e., the wheel in question regains stability too fast) (Z2) or even
3) shoots too quickly beyond the set value, additional pressure is added in proportion to the Δv decrease between the past and present cycle.
4) When the Δv present approaches the target value Δv$_S$ from a lower value (Z4), no differential portion is taken into account.

Thus, the following status-related control law is the result:

$$P_S = P_{HA} - k_P \Delta \Delta v + k_D \Delta \Delta v' - K_i \sum_{j=0}^{k} \Delta \Delta v(j),$$

wherein
K$_D$ is the control amplification for the differential portion with
k$_D$=k$_D$ $_{UP}$ (>0) for ΔΔv'<ΔΔv$_{max}$
k$_D$=k$_D$ $_{DOWN}$ (<0) for (ΔΔv'>ΔΔv$_{max}$) ∧ (ΔΔv>0)
k$_D$=0 for (|ΔΔv|<|ΔΔv$_{max}$|) ∨ [(ΔΔv<0) ∧ (ΔΔv'>0)]
ΔΔv'=Δv(k)−Δv(k−1)

In a correction circuit 83 the control amplification is adapted to correspond to the momentary amplification of the system. For this purpose the amplification of the brakes+wheels system $$\Delta v(k) = \Delta v(k-1) + k_S [P_{HA}(k) - P_{HA}(k-1)]$$

with k$_S$=1/k$_p$
is estimated in an identification circuit 84 through a PTH1 filter with state-related filter coefficients $$\phi(\Delta p) = \frac{fil}{\Delta p + fil} \text{ with } \Delta p = P_{HA}(k) - P_{HA}(k-1)$$

wherein fil=weighting factor (of the order of magnitude of an average rear axle pressure change), in accordance with the equation:

$$bpf, \Delta v = \frac{[\Delta v(k) - \Delta v(k-1)] + fil \cdot bpf, \Delta v}{P_{HA}(k) - P_{HA}(k-1) + fil} =$$

Intensification of pressure build-up $$bmf, \Delta p = \Delta v(k) - \frac{\Delta v(k-1) - fil \cdot bmf, \Delta v}{P_{HA}(k) - P_{HA}(k-1) - fil} =$$

Intensification of pressure relief

The corrected output signal P$_{s-corr}$ of the wheel speed controller 82, is then fed to a pressure control circuit (66–68 in FIG. 4; 85–88 and 101b and 102b in FIG. 5) in which the measured rear axle pressure P$_{HA}$ now acts on the control train which includes the systems rear wheel brakes, rear wheels, tires and road surface.

The two rear wheel speeds form the starting magnitudes of the control train. As already described, the measured wheel speed signal of the slower rear wheel is compared with the faster front wheel and the difference is fed to the comparator 81.

Figure 7:
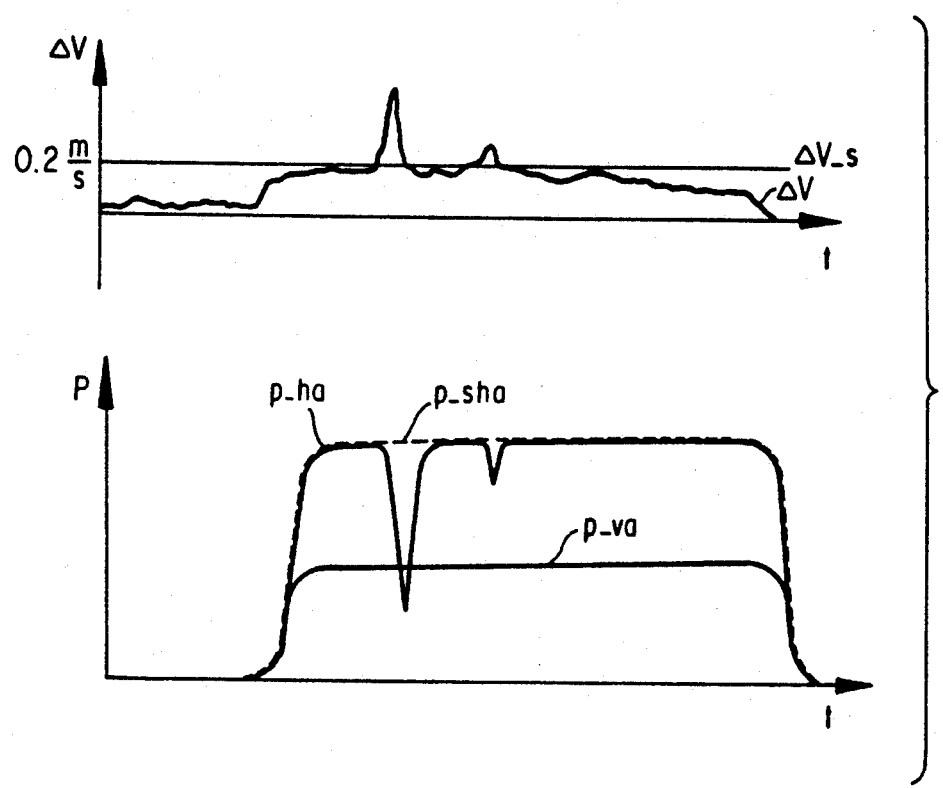
Figure 8:
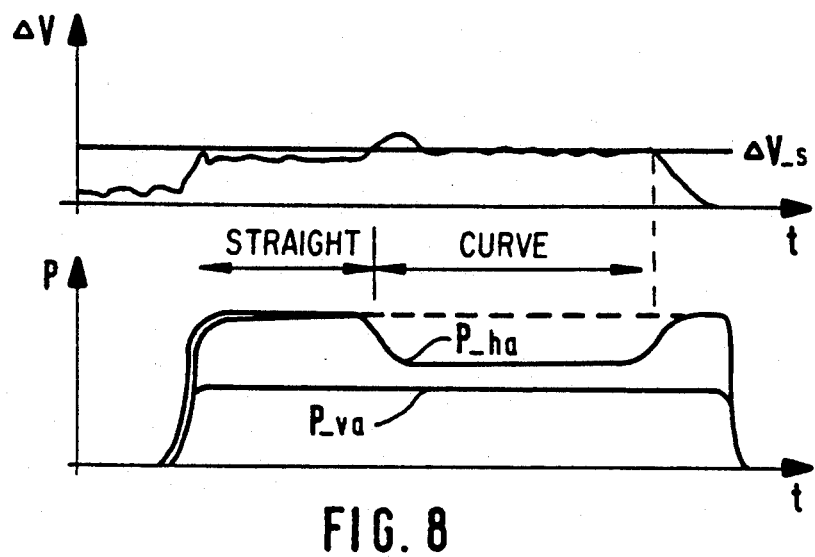

On the basis of the measured front axle pressure P$_{VA}$ (sensors 14, and 46 and 57) an upper limit P$_{S,HA}$ is obtained in a block 89 according to the equation $$P_{S,HA} = \frac{Const.1 \cdot G}{C_{STHA}} \left[ \sqrt{\frac{1 - \psi^2}{0.4} + \frac{Const.2 \cdot C_{STVA} \cdot P_{VA}}{G_{FZ}}} - \frac{1 - \psi}{0.4} - \frac{Const.3 \cdot C_{STVA} P_{VA}}{G_{FZ}} \right]$$

corresponding to the optimum braking force distribution for straight-line braking and loaded vehicle for the rear axle target pressure P$_{s-corr}$ determined in the wheel speed regulator, wherein
G$_{FZ}$: Vehicle weight (vehicle loaded)
Ψ: static rear axle load G$_{HA}$/G$_{FZ}$
C$_{STVA}$: brake characteristic of front axle
C$_{STHA}$: brake characteristic of rear axle
Const. 1 =r$_{DYN,HA}$/(2A$_{HA}$·r$_{HA}$·η$_{HA}$)
Const. 2 =A$_{VA}$·r$_{VA}$·2η$_{VA}$/(X·r$_{DYN,VA}$)
Const. 3 =Const. 2·X
Herein:
r$_{DYN,HA}$: dynamic tire radius rear wheels
r$_{DYN,VA}$: dynamic tire radius front wheels
η$_{HA}$: Rear wheel brake efficiency
η$_{VA}$: Front wheel brake efficiency
A$_{HA}$: Wheel cylinder area, rear wheels
A$_{VA}$: wheel cylinder area, front wheels
X: Center of gravity relative to wheel base
r$_{HA}$: effective friction radius, rear wheel brakes
r$_{VA}$: effective friction radius, front wheel brakes With this upper limit one aims, by regulating Δv to a permanent set value of about 0.2 m/s, to achieve a neutral vehicle performance in the great majority of braking situations: in the case of straight-line braking the rear axle pressure is adjusted according to the ideal braking force distribution (standard parabola), and only in the case of trouble due to the road (Δv rises→departure from control) is the pressure briefly relieved. (This is shown in FIG. 7). In braking on curves (large radius) the rear axle pressure is set fixedly at a pressure level lower than the standard-parabola pressure, so that neutral vehicle performance also results. (This is shown in FIG. 8). In the case of tighter curves the influence of the lowering of the rear axle pressure on a corresponding Δv change, however, becomes rather slight; this brings the result that the high Δv resulting in such situations on account of the circle dynamics can no longer be regulated to the fixed set value at ever so great a rear axle pressure relief, so that the vehicle exhibits understeer on account of the pressure-less rear axle brakes.

Figure 9:
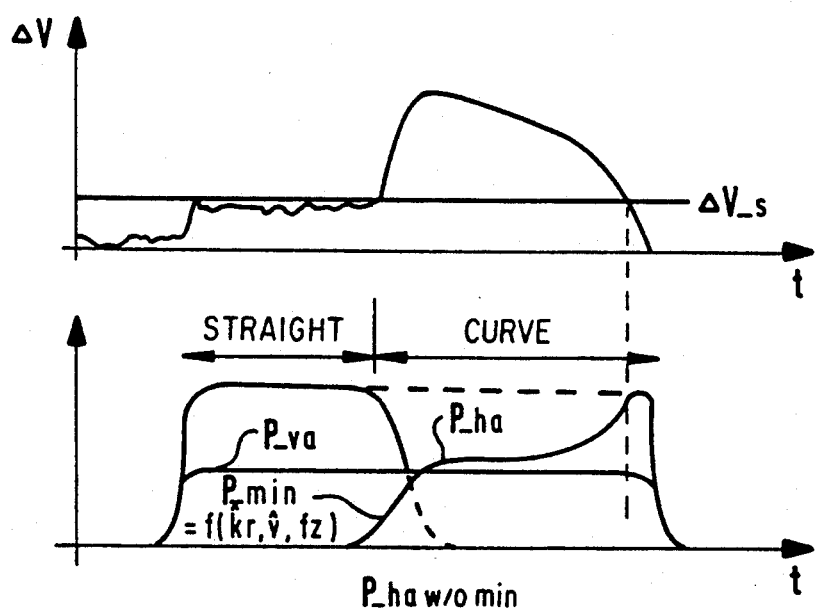

For this problem of tight curves the following solutions are available:
1) Preset a rear axle minimum pressure p-min (block 93) dependent upon the vehicle speed and the estimated "tightness of the curve" (from block 94), below which the rear axle target pressure p$_S$ must not fall (see FIG. 9); at higher speeds and large curve radii, P$_{MIN}$ is not effective to enable the rear axle pressure to be relieved for reasons of stability down to 0 for a brief period in case of any wheel instabilities.
2) Adaptation of Δv$_S$ to the vehicle speed v$_{ref}$ or to magnitudes reckoned from vehicle speed and pressure signals, e.g., K̂$_R$ (in block 92).

These top and bottom limitings are performed in a limiting block 90.

Regarding solution (1) above, the reference speeds $v_{ref}$ obtained in the ABS controller 100, which represent an estimate of the vehicle speed at each wheel, are fed to block 94 for estimating the vehicle speed according to the equation:

$$\hat{V}_{FZ} = 0.25 \, (v_{Ref1} + v_{Ref2} + v_{Ref3} + v_{Ref4})$$

The vehicle speed is monitored by the pressure signals and used in estimating the "curve tightness" according to the equation $$\hat{K}_R = SW \left( \frac{\hat{V}_{FZ}}{\Delta V_{LR}} - 0.5 \right)$$

wherein
SW = track width of vehicle at front axle
$\Delta V_{LR}$ = function of front wheel reference difference and rear wheel reference difference, i.e.,
$\Delta V_{LR} = f(|v_{Ref1} - v_{Ref3}|; |v_{Ref2} - v_{Ref4}|)$ The two estimates $\hat{V}_{FZ}$ and $\hat{K}_R$ are fed to a block 93 which gives the starting magnitudes p-min as the bottom limit pressure for the rear axle target pressure $P_{S\text{-}HA}$.

The following equation applies:

$$P_{MIN} = \left( \frac{Const.1}{\hat{K}_R} + \frac{Const.2}{\hat{V}_{FZ} + Const.3} + Const.4 \right) P_{S-HA}$$

wherein the constants const1, const2, const3 and const4 are determined by test driving, in the sense that on tight curves $P_{MIN}$ assumes approximately the $P_{VA}$ level (FIG. 9) (e.g., const1 = 20 [m], const2 = 1[m/sec], const3 = 1[m/s], const4 = 0[bar].

Figure 10:
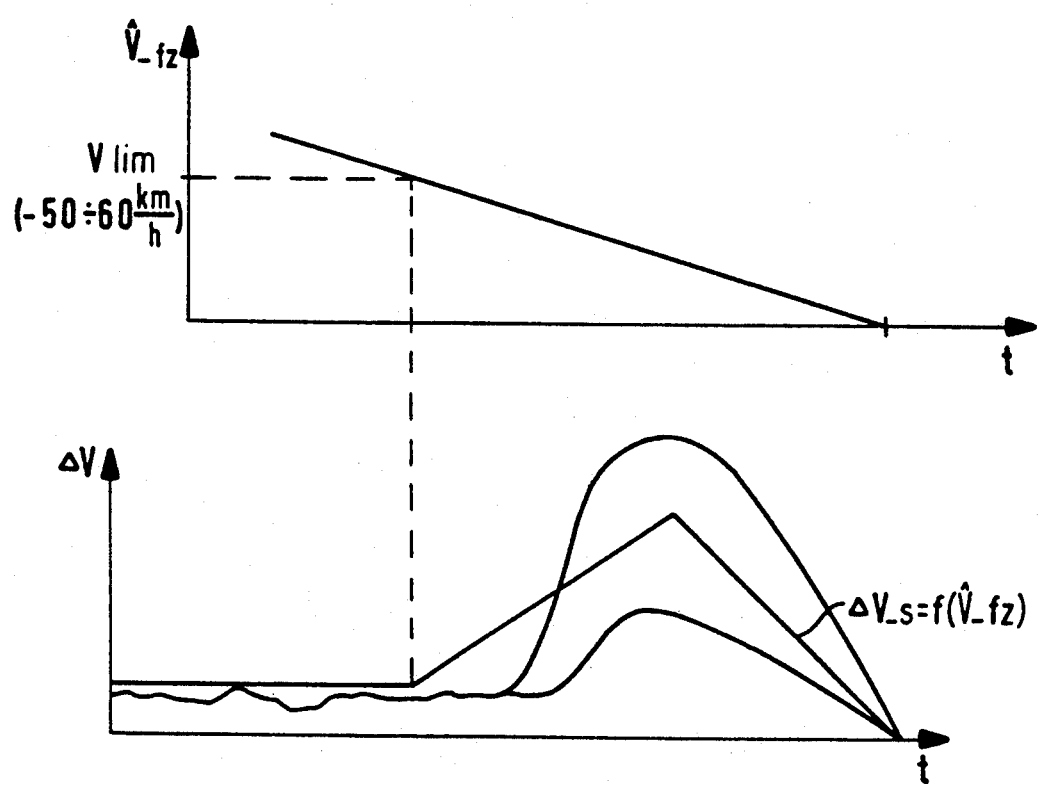

Below a certain speed $V_{LIM}$ a target value function is given as a function of $V_{FZ}$ such that it is exceeded only for critical braking on curves (i.e., tighter curves at higher speeds) (FIG. 10).

In the subordinated pressure control circuit the rear-axle pressure that is present is regulated to the target pressure $P_{corr}$ obtained in the wheel speed control. For this purpose the measured rear-axle pressure $P_{HA}$ is compared with the computed target pressure $P_{corr}$ in the comparator 91 and this difference is fed to a pressure controller 85 which has a proportional-integral transfer characteristic.

The control circuit here includes the rear axle valve component. Since in accordance with the pressure-volume characteristic of the brake system the change in pressure depends on the pressure level in the wheel brake cylinder itself and on the temperature, this pressure gradient is computed in an identification circuit 95 according to the $$bpf = \frac{P_{HA1}(k) - P_{HA1}(k-1) + fil \cdot bpf}{U_{K,CORR}(k-1) - t_p(k-1) + fil} \text{ Pressure Increase}$$

$$bmf = \frac{P_{HA1}(k) - P_{HA1}(k-1) - fil \cdot bmf}{U_{K,CORR}(k-1) - t_m(k-1) - fil} \text{ Pressure Decrease}$$

A distinction must be made between pressure increase and pressure decrease because different rates of pressure change are involved. This chain intensification obtained according to the above equations is used as a reciprocal of the proportional amplification of the pressure controller 85 (amplification correction block 86). Thus, the control law of the pressure controller has the following appearance:

$$U_k^+ = [P_{S,CORR}(k) - P_{HA}(k)] \frac{1}{bpf} +$$

$$K_i \sum_{j=1}^{k} [P_{S,CORR}(j) - P_{HA}(j)] \text{ Pressure increase}$$

$$U_k^- = [P_{S,CORR}(k) - P_{HA}(k)] \frac{1}{bmf} +$$

$$K_i \sum_{j=1}^{k} [P_{S,CORR}(j) - P_{HA}(j)] \text{ Pressure decrease}$$

The valve response times $t_p$, $t_m$, (from estimating block 87) applicable to the pressure increase and pressure relief are considered in an adder 88 by addition to the computed net valve response time. The valve response times are estimated and updated in block 87 by means of a (strong) first-order filter according to the equations $$t_p = fil_{tp} t_p + (1 - fil_{tp})[P_{s,corr}(k-1) - P_{HA}(k)]k_{tp} > 0$$

Pressure increase
$$t_m = fil_{tm} t_m + (1 - fil_{tm})[P_{s,corr}(k-1) - P_{HA}(k)]k_{t\text{-}m} < 0$$

Pressure decrease
($k_{tp}$ and $k_{tm}$ range between 1 and 5).

At the same time $k_{tp}$ and $k_{tm}$ are amplification factors which are to be set in a driving test for good performance of the pressure controller. This computation of the valve response times offers the important advantage that stray values in the valve response times and response times varying in time (e.g., by "valve aging") are tested and appropriately corrected.

By means of switch 105 a changeover can be made between the pressure control according to the invention and the ABS control for the rear axle. In the partial braking range, i.e., if no front wheel has yet reached the ABS response threshold, the rear axle is controlled according to the invention.

The conditions for entering ABS control are:
Only when a front wheel is already under ABS control and the other front wheel is already calling for a certain filter time-pressure release, is the changeover made.

Conditions for departing from ABS are:
When the computed valve control time of a front wheel exceeds for a certain time the maximum opening time (cycle time; in this case 20 ms) (i.e., front pressure is too low) or
when both front wheels have dropped below a certain minimum speed, the change-back is made.

Both algorithms (ABS and pressure control) are run through preferably always, both in the partial braking range and in the ABS occurrence, as well as during the particular transitions. According to the logic described above, the determinant valve response time, i.e., as computed either in the ABS controller or in the pressure controller, is utilized for activating the valve driver.

$P_{S\text{-}HA}$ also limits the rear axle pressure in ABS operation.

We claim:

1. A brake pressure control apparatus for a vehicle having a front axle with two front wheels which exhibit wheel speeds, a rear axle with two rear wheels which exhibit wheel speeds, and a brake at each wheel, said apparatus comprising
   means for determining the speeds of the front wheels including a faster front wheel,
   means for determining the speeds of the rear wheels including a slower rear wheel,
   braking means which produces brake pressure,
   ABS means comprising ABS inlet valve means and ABS outlet valve means for controlling brake pressure at the brakes of each of said front and rear wheels,
   means for determining when said ABS means is not operating,
   means for providing brake pressure directly from said braking means to said brakes at each front wheel and to said brakes at each rear wheel, and
   means for controlling brake pressure to said brakes at each rear wheel so that the slower rear wheel runs slower than the faster front wheel by a given small speed difference $\Delta v_s$ when said ABS means is not operating.

2. A brake pressure control apparatus as in claim 1 wherein said means for controlling brake pressure to said brakes at each said rear wheel comprises
   isolating valve means for isolating said brakes at said rear wheels from said braking means when said ABS is not operating,
   pressure generating means for generating brake pressure to said brakes at said rear wheels when said brakes at said rear wheels are isolated from said braking means, and
   regulating valve means for regulating brake pressure to said brakes at said rear wheels when said brakes at said rear wheels are isolated from said braking means.

3. A brake pressure control apparatus as in claim 2 wherein said ABS means further comprises return pump means associated with said outlet valve means, said pressure generating means comprising said return pump means, said apparatus further comprising ASR means comprising said isolating valve means and said regulating valve means.

4. A brake pressure control apparatus as in claim 1 wherein said means for providing brake pressure from said braking means comprises two brake circuits, each circuit connecting said braking means to the brake of one front wheel and the brake of a diagonally opposed rear wheel, said means for controlling brake pressure to said brakes at each rear wheel comprising
   isolating valve means in each said circuit for isolating said braking means from said brake at each rear wheel in each circuit when said ABS is not operating, said isolating valve means being distinct from said ABS inlet valve means,
   pressure generating means in each said circuit for generating brake pressure to said brakes at said rear wheels when said brakes at said rear wheels are isolated from said braking means, and
   regulating valve means for regulating brake pressure to said brakes at said rear wheels when said brakes at said rear wheels are isolated from said braking means.

5. A brake pressure control apparatus as in claim 4 wherein said ABS means further comprises return pump means associated with said ABS outlet valve means in each said circuit, said pressure generating means comprising said return pump means in each said circuit, said apparatus further comprising ASR means comprising said isolating valve means and said regulating valve means.

6. A brake pressure control apparatus as in claim 1 further comprising
   means for detecting brake pressure to said brakes at said front wheels, and
   means for determining a maximum permissible brake pressure to said brakes of said rear wheels based on said detected brake pressure at said front wheels,
   said means for controlling brake pressure limiting said brake pressure to said brakes at said rear wheels to said maximum permissible brake pressure.

7. A brake pressure control apparatus as in claim 1 further comprising
   means for determining a vehicle speed based on the speed of at least one of said wheels,
   means for determining curve radius based on the difference in speeds of at least one front wheel and at least one rear wheel, and
   means for determining a minimum brake pressure to said brakes of said rear wheels based on said vehicle speed and said curve radius,
   said means for controlling brake pressure limiting said brake pressure to said brakes at said rear wheels to said minimum brake pressure.

* * * * *